(12) United States Patent
Propheter-Hinckley

(10) Patent No.: US 11,333,036 B2
(45) Date of Patent: May 17, 2022

(54) ARTICLE HAVING CERAMIC WALL WITH FLOW TURBULATORS

(71) Applicant: UNITED TECHNOLOGIES CORPORATION, Farmington, CT (US)

(72) Inventor: Tracy A. Propheter-Hinckley, Manchester, CT (US)

(73) Assignee: RAYTHEON TECHNOLOGIES, Farmington, CT (US)

( * ) Notice: Subject to any disclaimer, the term of this patent is extended or adjusted under 35 U.S.C. 154(b) by 153 days.

(21) Appl. No.: 16/557,046

(22) Filed: Aug. 30, 2019

(65) Prior Publication Data

US 2019/0390566 A1 Dec. 26, 2019

Related U.S. Application Data

(63) Continuation of application No. 15/354,083, filed on Nov. 17, 2016, now Pat. No. 10,436,062.

(51) Int. Cl.
*B32B 18/00* (2006.01)
*F01D 5/28* (2006.01)
(Continued)

(52) U.S. Cl.
CPC ............ *F01D 25/005* (2013.01); *B32B 18/00* (2013.01); *C04B 35/80* (2013.01); *F01D 5/282* (2013.01); *F01D 5/284* (2013.01); *F01D 9/041* (2013.01); *F02C 3/04* (2013.01); *C04B 2235/5256* (2013.01); *C04B 2235/5268* (2013.01); *C04B 2235/94* (2013.01); *C04B 2235/945* (2013.01); *C04B 2237/38* (2013.01);
(Continued)

(58) Field of Classification Search
CPC ................ C04B 35/80; C04B 2237/38; C04B 2235/5268; F05D 2260/2212; F05D 2300/6033; F05D 2240/127; F01D 5/284; B23B 18/00
See application file for complete search history.

(56) References Cited

U.S. PATENT DOCUMENTS

| 3,215,511 A | 11/1965 | Chisholm |
| 4,137,008 A | 1/1979 | Grant et al. |

(Continued)

FOREIGN PATENT DOCUMENTS

| EP | 0764764 | 3/1997 |
| EP | 1764481 | 3/2007 |

(Continued)

OTHER PUBLICATIONS

U.S. Appl. No. 13/429,474, filed Mar. 26, 2012.

(Continued)

*Primary Examiner* — Courtney D Heinle
*Assistant Examiner* — Andrew J Marien
(74) *Attorney, Agent, or Firm* — Carlson, Gaskey & Olds, P.C.

(57) ABSTRACT

An article includes a ceramic matrix composite wall that defines at least a side of a passage. The ceramic wall includes a ceramic matrix composite flow turbulator that projects into the passage. The flow turbulator is formed of ceramic matrix composite. The ceramic matric composite of the wall comprises woven fibers that are dispersed in a ceramic body matrix. An airfoil and a gas turbine engine are also disclosed.

18 Claims, 3 Drawing Sheets

(51) Int. Cl.
  *F01D 25/00* (2006.01)
  *F01D 9/04* (2006.01)
  *F02C 3/04* (2006.01)
  *C04B 35/80* (2006.01)

(52) U.S. Cl.
  CPC .... *C04B 2237/86* (2013.01); *F05D 2240/127* (2013.01); *F05D 2260/2212* (2013.01); *F05D 2260/2214* (2013.01); *F05D 2260/22141* (2013.01); *F05D 2300/6033* (2013.01); *F05D 2300/6034* (2013.01); *Y02T 50/60* (2013.01)

(56) References Cited

U.S. PATENT DOCUMENTS

| | | |
|---|---|---|
| 4,247,259 A | 1/1981 | Saboe et al. |
| 4,396,349 A | 8/1983 | Hueber |
| 4,914,794 A | 4/1990 | Strangman |
| 5,358,379 A | 10/1994 | Pepperman et al. |
| 5,538,380 A | 7/1996 | Norton et al. |
| 5,681,616 A | 10/1997 | Gupta et al. |
| 5,705,231 A | 1/1998 | Nissley et al. |
| 5,951,892 A | 9/1999 | Wolfla et al. |
| 6,000,906 A | 12/1999 | Draskovich |
| 6,102,656 A | 8/2000 | Nissley et al. |
| 6,224,963 B1 | 5/2001 | Strangman |
| 6,316,078 B1 | 11/2001 | Smialek |
| 6,503,574 B1 | 1/2003 | Skelly et al. |
| 6,514,046 B1 | 2/2003 | Morrison et al. |
| 6,543,996 B2 | 4/2003 | Koschier |
| 6,703,137 B2 | 3/2004 | Subramanian |
| 6,709,230 B2 | 3/2004 | Morrison et al. |
| 6,846,574 B2 | 1/2005 | Subramanian |
| 7,104,756 B2 | 9/2006 | Harding et al. |
| 7,316,539 B2 | 1/2008 | Campbell |
| 7,326,030 B2 | 2/2008 | Albrecht et al. |
| 7,435,058 B2 | 10/2008 | Campbell et al. |
| 7,452,182 B2 | 11/2008 | Vance et al. |
| 7,520,725 B1 | 4/2009 | Liang |
| 7,670,116 B1 | 3/2010 | Wilson, Jr. et al. |
| 7,963,745 B1 | 6/2011 | Liang |
| 8,079,806 B2 | 12/2011 | Tholen et al. |
| 8,182,208 B2 | 5/2012 | Bridges, Jr. et al. |
| 8,197,211 B1 | 6/2012 | Liang |
| 8,202,043 B2 | 6/2012 | McCaffrey |
| 8,251,651 B2 | 8/2012 | Propheter-Hinckley et al. |
| 8,366,392 B1 | 2/2013 | Laing |
| 8,480,366 B2 | 7/2013 | Malecki et al. |
| 8,506,243 B2 | 8/2013 | Strock et al. |
| 8,821,124 B2 | 9/2014 | Viens et al. |
| 2006/0284337 A1* | 12/2006 | Subramanian ........ C04B 35/573 264/258 |
| 2008/0159850 A1 | 7/2008 | Tholen et al. |
| 2010/0075106 A1 | 3/2010 | Merrill et al. |
| 2010/0136258 A1 | 6/2010 | Strock et al. |
| 2014/0030076 A1* | 1/2014 | Nunez .................. B29C 70/222 415/183 |
| 2016/0090851 A1 | 3/2016 | Carr et al. |
| 2016/0146468 A1* | 5/2016 | Gao .......................... F23R 3/12 60/742 |
| 2016/0186660 A1* | 6/2016 | Bergholz ................. F23R 3/16 416/95 |
| 2018/0119549 A1* | 5/2018 | Vetters .................... F01D 5/147 |

FOREIGN PATENT DOCUMENTS

| | | |
|---|---|---|
| EP | 2011970 | 1/2009 |
| EP | 2105579 | 9/2009 |
| EP | 2853688 | 4/2015 |
| EP | 3040516 | 7/2016 |
| EP | 3124747 | 2/2017 |
| GB | 2272453 | 5/1994 |
| JP | 61066802 | 4/1986 |
| JP | 05321602 | 12/1993 |

OTHER PUBLICATIONS

U.S. Appl. No. 14/659,718, filed Mar. 17, 2015.
U.S. Appl. No. 14/812,668, filed Jul. 29, 2015.
European Search Report for European Patent Application No. 17202453.1 completed Apr. 13, 2018.

* cited by examiner

ARTICLE HAVING CERAMIC WALL WITH FLOW TURBULATORS

CROSS-REFERENCED TO RELATED APPLICATION

This application is a continuation of U.S. application Ser. No. 15/354,083, which was filed on Nov. 17, 2016.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An article according to an example of the present disclosure includes a ceramic wall that defines at least a side of a passage. The ceramic wall includes a flow turbulator that projects into the passage. The flow turbulator is formed of ceramic matrix composite.

In a further embodiment of any of the foregoing embodiments, the ceramic wall includes a body portion from which the flow turbulators project, and the body portion is formed of ceramic matrix composite having a plurality of fibers disposed in a ceramic matrix.

In a further embodiment of any of the foregoing embodiments, the ceramic matrix composite of the flow turbulator includes a plurality of fibers disposed in a ceramic matrix, and the ceramic matrix of the body portion and the ceramic matrix of the flow turbulator have equivalent base compositions.

In a further embodiment of any of the foregoing embodiments, the base compositions are silicon-containing.

In a further embodiment of any of the foregoing embodiments, the fibers of the body portion are woven.

In a further embodiment of any of the foregoing embodiments, the ceramic matrix composite of the flow turbulator includes a plurality of fibers disposed in a ceramic matrix. The fibers of the body portion have a common body fiber orientation, and the fibers of the flow turbulator have a common turbulator fiber orientation that is transverse to the common body fiber orientation.

In a further embodiment of any of the foregoing embodiments, the flow turbulator is an elongated strip.

In a further embodiment of any of the foregoing embodiments, the ceramic matrix composite of the flow turbulator includes a plurality of fibers disposed in a ceramic matrix, and the fibers of the flow turbulator are unidirectionally oriented in the elongated direction of the elongated strip.

In a further embodiment of any of the foregoing embodiments, the fibers of the flow turbulator have common fiber diameters, and the elongated strip has a height of at least two fiber diameters.

In a further embodiment of any of the foregoing embodiments, the fibers of the flow turbulator have common fiber diameters, and the elongated strip has a height of at least four fiber diameters.

In a further embodiment of any of the foregoing embodiments, the elongated strip has a height of at least 5 mils (0.127 millimeters).

In a further embodiment of any of the foregoing embodiments, the ceramic wall is in an airfoil section and defines at least a portion of an airfoil profile of the airfoil section.

An airfoil according to an example of the present disclosure includes an airfoil section that defines an airfoil profile. The airfoil section includes a ceramic wall that has an exterior side that defines at least a portion of the airfoil profile and an interior side that defines at least a portion of a passage. The interior side of the ceramic wall includes a flow turbulator that projects into the passage. The flow turbulator is formed of ceramic matrix composite.

In a further embodiment of any of the foregoing embodiments, the ceramic wall includes a body portion from which the flow turbulator projects. The body portion is formed of ceramic matrix composite that has a plurality of fibers disposed in a ceramic matrix. The ceramic matrix composite of the flow turbulator includes a plurality of fibers disposed in a ceramic matrix, and the ceramic matrix of the body portion and the ceramic matrix of the flow turbulator have equivalent base compositions.

In a further embodiment of any of the foregoing embodiments, the base compositions are silicon-containing.

In a further embodiment of any of the foregoing embodiments, the fibers of the body portion are woven.

In a further embodiment of any of the foregoing embodiments, the flow turbulator is an elongated strip, and the fibers of the flow turbulator are unidirectionally oriented in the elongated direction of the elongated strip.

In a further embodiment of any of the foregoing embodiments, the fibers of the flow turbulator have common fiber diameters, and the elongated strip has a height of at least two fiber diameters.

A gas turbine engine according to an example of the present disclosure includes a compressor section, a combustor in fluid communication with the compressor section, and a turbine section in fluid communication with the combustor. One of the turbine section or the compressor section includes an article that has a ceramic wall that defines at least a side of a passage. The ceramic wall includes a flow turbulator that projects into the passage. The flow turbulator is formed of ceramic matrix composite.

In a further embodiment of any of the foregoing embodiments, the ceramic wall includes a body portion from which the flow turbulator projects. The body portion is formed of ceramic matrix composite that has a plurality of fibers disposed in a ceramic matrix. The ceramic matrix composite of the flow turbulator includes a plurality of fibers disposed in a ceramic matrix, and the ceramic matrix of the body portion and the ceramic matrix of the flow turbulator have equivalent base compositions. The flow turbulator is an elongated strip, and the fibers of the flow turbulator are unidirectionally oriented in the elongated direction of the elongated strip.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
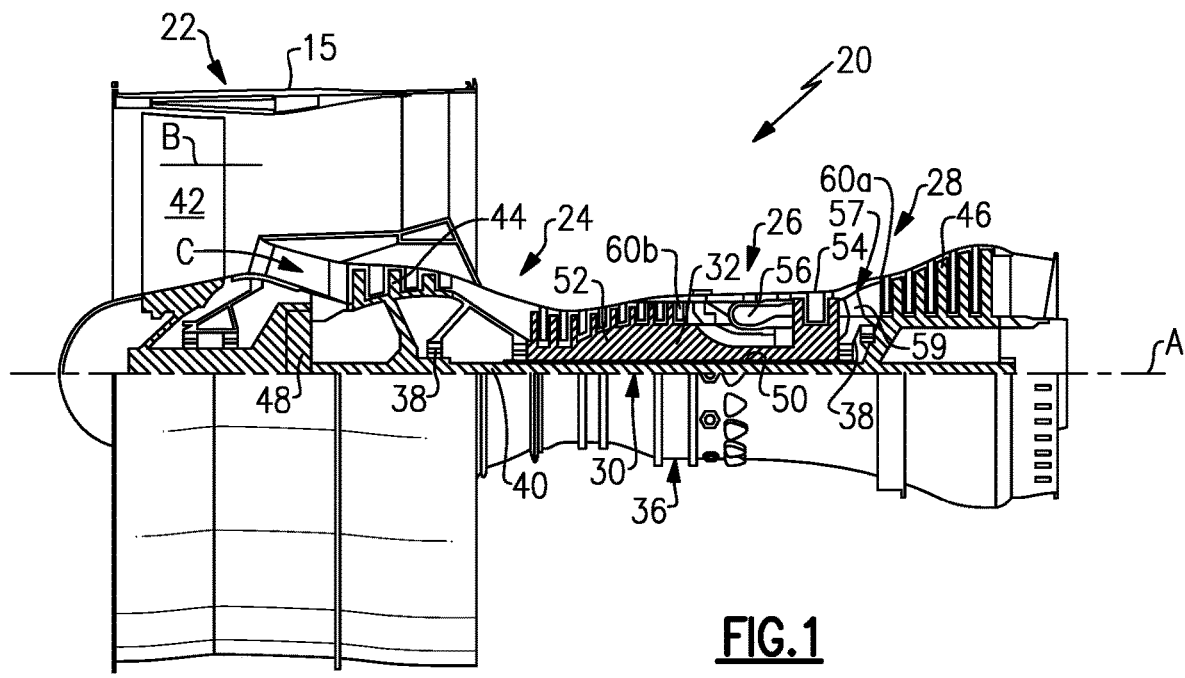
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

In gas turbine engines air is often bled from the compressor for cooling alloy components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2:
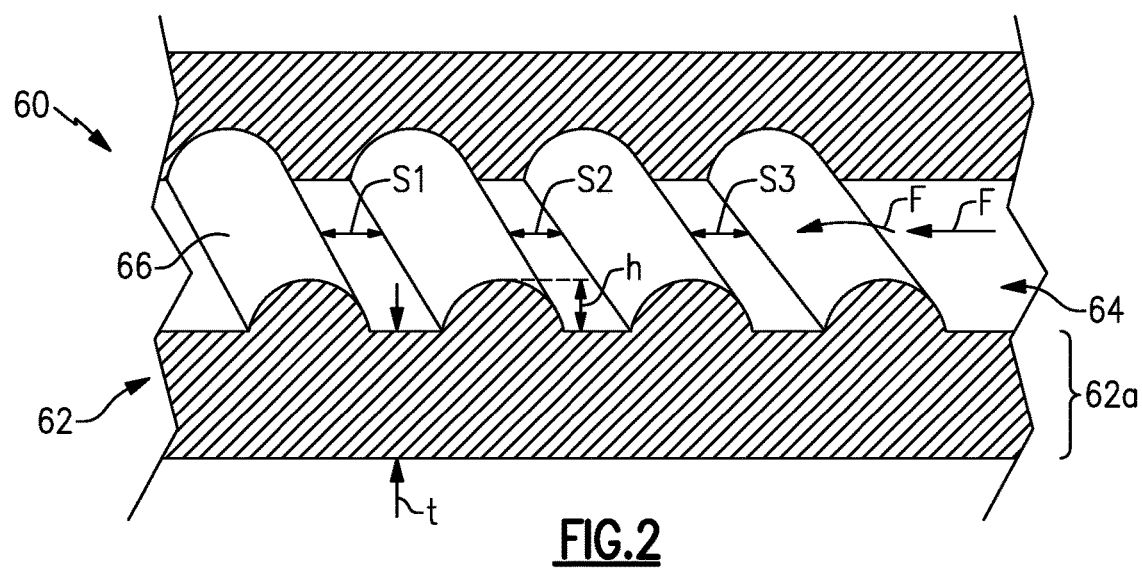
FIG. 2 illustrates an example article having a ceramic wall with flow turbulators.

FIG. 2 illustrates a representative portion of one such component, namely an article 60. For instance, the article 60 can be a turbine vane, as represented at 60a in FIG. 1, or a compressor vane, as represented at 60b in FIG. 1. As will be appreciated, although the examples herein may be described in the context of a gas turbine engine or an airfoil, this disclosure is not limited to airfoils, and the examples may be applicable to other engine components that are exposed to high temperatures, or non-engine articles that are exposed to high temperatures.

In the illustrated example, the article 60 includes a ceramic wall 62 that defines, at least in part, a passage 64. For instance, the passage 64 may convey fluid or cooling bleed air, generally represented as flow F. The ceramic wall 62 includes a body portion 62a and a flow turbulator 66 that projects into the passage 64. In this example, the flow turbulator 66 projects from the body portion 62a into the passage 64. The ceramic wall 62 in the illustrated example includes a plurality of flow turbulators 66, but may alternatively have fewer flow turbulators 66 than shown or more flow turbulators 66 than shown. In this example, the flow turbulators 66 are evenly spaced apart along the passage 64. The spacings are represented at S1, S2, and S3. For even spacing, S1=S2=S3. The turbulators 66 disturb the flow F and cause flow mixing. The mixing facilitates heat removal from the ceramic wall 62. Alternatively, the flow turbulators 66 may be non-unfiromly spaced for a more randomized mixing effect. For non-unfirom spacing, S1≠S2≠S3. In another alternative, the flow turbulators 66 may have a first section that has first uniform spacings, and a second section that has second, closer uniform spacings. For such spacings, S1=S2 and S1>S3. The different spacings provide different mixing effects in different regions of the passage 64.

As the name indicates, the ceramic wall 62 is formed of ceramic. A ceramic is a compound of metallic or metalloid elements bonded with nonmetallic elements or metalloid elements primarily in ionic or covalent bonds. Example ceramic materials may include, but are not limited to, oxides, carbides, nitrides, borides, silicides, and combinations thereof. In further example, the body portion 62a of the ceramic wall 62 may be a monolithic ceramic or a ceramic matrix composite (CMC). For example, a monolithic ceramic is composed of a single, homogenous ceramic material. A composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

The flow turbulators 66 of the ceramic wall 62 are formed of ceramic which is CMC. For instance, the CMC of the flow turbulators 66 has a reinforcement phase, such as ceramic or carbon fibers, dispersed in a ceramic matrix formed of oxides, carbides, nitrides, borides, silicides, or combinations thereof. As used herein, the term "fiber" may refer to a monofilament fiber or a fiber tow. A fiber tow includes a bundle of filaments. A single tow may include hundreds or thousands of filaments.

Figure 3:
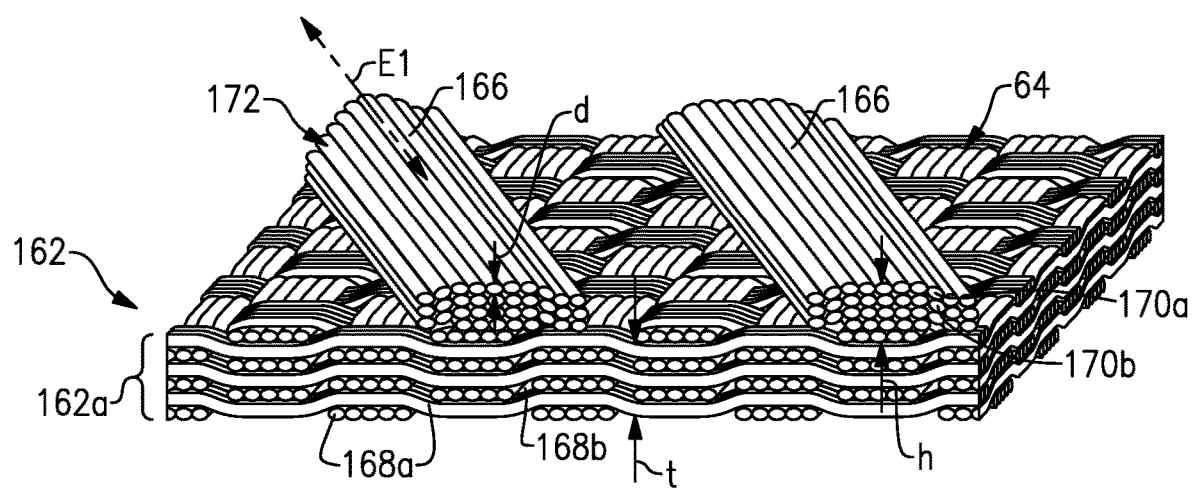
FIG. 3 illustrates another example ceramic with flow turbulators.

FIG. 3 illustrates a representative portion of another example ceramic wall 162. In this disclosure, like reference numerals designate like elements where appropriate and reference numerals with the addition of one-hundred or multiples thereof designate modified elements that are understood to incorporate the same features and benefits of the corresponding elements. In this example, the ceramic wall 162 includes a body portion 162a and flow turbulators 166 that project from the body portion 162a into the passage 64. The body portion 162a and the flow turbulators 166 are both formed of CMCs. The CMC of the body portion includes body fibers 168a that are disposed in a ceramic body matrix 168b (between and around the fibers 168a). The CMC of the flow turbulators 166 includes turbulator fibers 170a that are disposed in a turbulator ceramic matrix 170b (between and around the fibers 170a). For example, the fibers 168a/170a are independently selected from ceramic fibers and carbon fibers. The matrices 168b/170b are independently selected from oxides, carbides, nitrides, borides, silicides, or combinations thereof.

In a further example, the ceramic matrices 168b/170b have equivalent base compositions. For instance, the predominant ceramic in each ceramic matrix 168b/170b is the same composition of ceramic, such as the same oxide, carbide, nitride, boride, or silicide. In a further example, the predominant ceramic in each ceramic matrix 168b/170b is a silicon-containing ceramic, such as but not limited to silicon carbide.

The fibers 168a of the body portion 162a may be woven or non-woven, but most typically are non-randomly arranged. In the illustrated example, the fibers 168a are woven and include fibers 168a that are oriented in a common 0 degree direction and other fibers 168a that are provided in bundles in a common 90 degree direction. As will be appreciated, the bundles of fibers 168a could additionally or alternatively have other orientation configurations, such as but not limited to 0/45 degrees, 0/45/90 degrees, or unidirectional (all 0 degrees).

In this example, the flow turbulators 166 are provided as elongated strips 172. The strips 172 may be generally rectangular or generally semi-ovular in cross-section, but other geometries could also be used to control the mixing and turbulence provided by the strips 172. The fibers 170a of the flow turbulators 166 are unidirectionally or commonly oriented in the direction of elongation E1 of the elongated strips 172. Additionally, the orientation direction of the fibers 170a of the flow turbulators 166 is transverse to the one or both of the common 0 degree orientation or the common 90 degree orientation of the fibers 168a, which may facilitate reinforcing the ceramic wall 162.

The fibers 168a of the body portion 162a may provide a textured surface in the passage 64, particularly if the fibers 168a are woven and cross over and under each other. Although the textured surface may provide some flow mixing, the flow turbulators 166 are generally larger than the height of the texture. For example, the size of the flow turbulators 166 can be represented with reference to the diametric size of the fibers 170a, which may be the same size and composition as the fibers 168a. The fibers 170a of the flow turbulators 166 have common fiber diameters, represented at "d." For a monofilament fiber the diameter is just the diameter of the filament. For a fiber tow, the diameter is the diametric size of the bundle of filaments. The elongated strips 172 have a height, represented at "h," of at least two fiber diameters d, where the height is the direction orthogonal to the elongated direction E1 and generally orthogonal to the textured surface. In a further example, the elongated strips 172 have a height of at least four fiber diameters d, for a greater turbulating effect. In some examples, the height is at least 10 fiber diameters and is no more than approximately thirty fiber diameters. In one further example, a fiber tow is about 5 mils (0.127 millimeters) to about 30 mils (0.762 millimeters) in diameter. Therefore, if the height h of the elongated strips 172 is two diameters, then the actual height of the strip 172 would be about 10 mils (0.254 millimeters) to about 60 mils (1.524 millimeters). In another example, if the height h of the elongated strips 172 is one diameter, then the actual height of the strip 172 would be about 5 mils (0.127 millimeters) to about 30 mils (0.762 millimeters).

In an additional example, the size of the flow turbulators 166 is represented with reference to the thickness, represented at "t," of the body portion 162a of the ceramic wall 162. For instance, the elongated strips 172 have a height of 5% to 50% of the thickness t.

Figure 4:
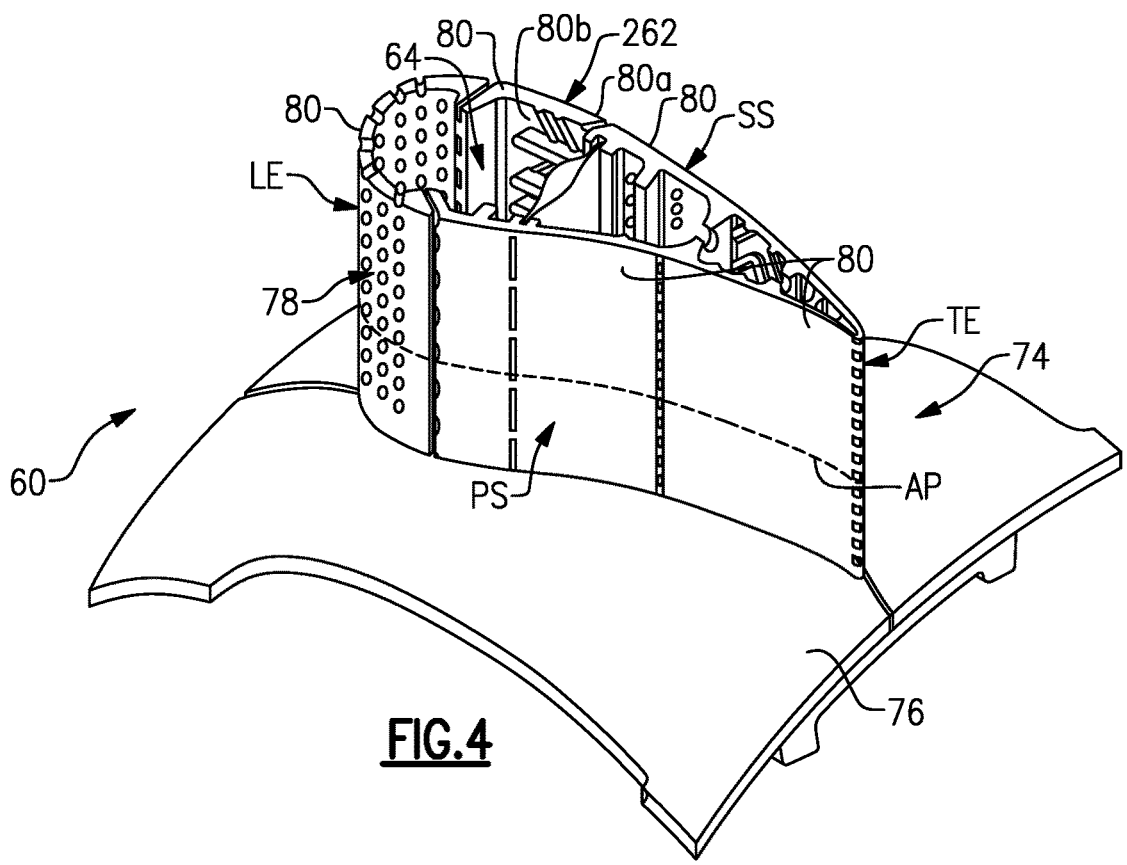
FIG. 4 illustrates a gas turbine engine vane with a ceramic wall having flow turbulators.

FIG. 4 illustrates another example ceramic wall 262. In this example, the ceramic wall 262 is in the article 60, which is a gas turbine engine turbine vane 74. The turbine vane 74 includes a platform or (inner) endwall 76 and an airfoil section 78 that extends from the endwall 76. Although not shown, the vane 74 may have an outer platform or endwall. The airfoil section 78 may be hollow and can include one or more internal passages 64.

The airfoil section 78 defines an airfoil profile, AP, which is the peripheral shape of the airfoil section 78 when viewed in a radial direction. For example, the airfoil profile has a wing-like shape that provides a reaction force via Bernoulli's principle with regard to flow over the airfoil section 78. The airfoil profile generally includes a leading end (LE), a trailing end (TE), a pressure side (PS), and a suction side (SS).

In this example, the airfoil section 78 is formed of a plurality of distinct walls or panels 80 that define, at least in part, the airfoil profile AP. The ceramic wall 262 is or is part of one of the panels 80.

Figure 5:
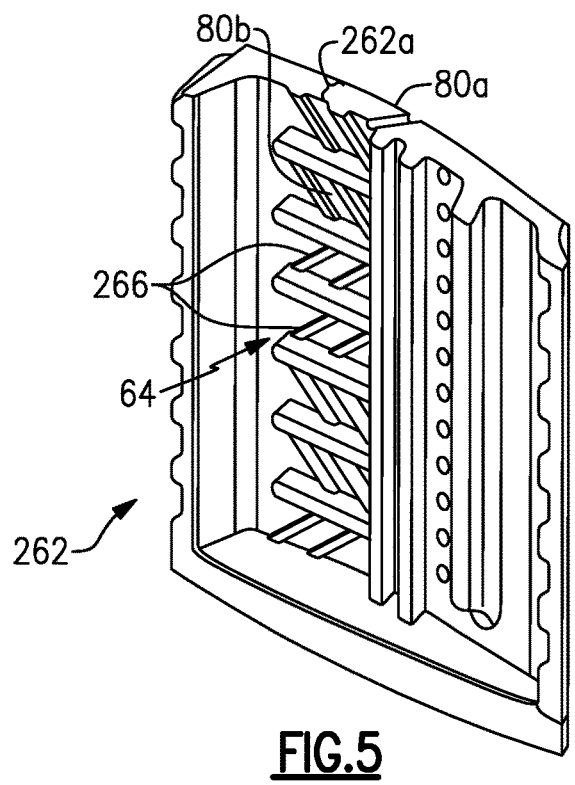
FIG. 5 illustrates an isolated view of the ceramic wall of FIG. 4.

FIG. 5 shows an isolated view of a portion of the ceramic wall 262. As shown, the body portion 262a of the ceramic wall 262 includes an exterior side 80a and an interior side 80b. The exterior side 80a defines at least a portion of the airfoil profile AP and the interior side 80b defines at least a portion of the passage 64. The flow turbulators 266 project from the body portion 262a into the passage 64, which may be divided into sub-passages. The ceramic wall 262 may otherwise be configured as described above for the examples the ceramic walls 62/162.

The ceramic wall 62/162/262 may be fabricated using generally known ceramic fabrication techniques. For instance, fiber layers may be stacked or laid-up in a desired configuration (e.g. the 0/90, 0/45, 0/45/90 configurations described herein) to form a preform. The fibers layers may be pre-impregnated with a preceramic material, such as a preceramic polymer, that ultimately forms the ceramic matrix of the CMC (in whole or in part). Alternatively or additionally, some or all of the ceramic matrix can be deposited subsequent to the stacking of the fibers layers, such as by chemical vapor deposition.

The fibers of the flow turbulators 66/166/266 will most typically be arranged on the (green) preform in the desired configuration of the flow turbulators 66/166/266. Alternatively, the fibers of the flow turbulators 66/166/266 could be arranged on the preform in a semi-green state or fully processed state in which the ceramic matrix of the body portion 62a/162a/262a has been fully or substantially fully formed. For instance, the fibers of the flow turbulators 66/166/266 may be arranged as individual fibers, fiber bundles, fiber tapes, or the like. Similar to the fibers of the body portion 62a/162a/262a, the fibers of the flow turbulators 66/166/266 may be pre-impregnated with a preceramic material or the ceramic matrix of the flow turbulators 66/166/266 may be deposited subsequent to arranging the fibers, by chemical vapor deposition. The preform is then further processed, such that the body portion 62a/162a/262a and flow turbulators 66/166/266 are co-processed, to form the final or near final ceramic wall 62/162/262. If a preceramic polymer is used, the further processing may include a pyrolysis step to convert the preceramic polymer to ceramic. Alternatively or additionally, chemical vapor deposition may be used to deposit ceramic as the ceramic matrices. The body portion 62a/162a/262a and the flow turbulators 66/166/266 do not have to be co-processed; however, the co-processing may facilitate bonding between the body portion 62a/162a/262a and the flow turbulators 66/166/266 by integral formation of the ceramic matrices.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An article comprising:
a ceramic matrix composite wall defining at least a side of a passage, the ceramic matrix composite wall including a ceramic matrix composite flow turbulator that projects into the passage, wherein the ceramic matrix composite of the wall comprises woven fibers that are dispersed in a ceramic body matrix, wherein the woven fibers include a first plurality of fibers that are oriented in a common first direction and second plurality of fibers that are oriented in a common second direction, and wherein the flow turbulator is an elongated strip having an elongated direction that is transverse to at least one of the first and second directions, and wherein the ceramic matrix composite of the flow turbulator includes a plurality of fibers disposed in a ceramic matrix, and the fibers of the flow turbulator are unidirectionally oriented in the elongated direction of the elongated strip.

2. The article as recited in claim 1, wherein the ceramic matrix of the body portion and the ceramic matrix of the flow turbulator have equivalent base compositions.

3. The article as recited in claim 2, wherein the base compositions are silicon-containing.

4. The article as recited in claim 1, wherein the second plurality of fibers includes bundles of fibers.

5. The article as recited in claim 1, wherein the second direction is different from the first direction.

6. The article as recited in claim 5, wherein the second direction is normal to the first direction.

7. The article as recited in claim 5, wherein the second direction is offset from the first direction by 45 degrees.

8. The article as recited in claim 1, wherein the fibers of the flow turbulator have common fiber diameters, and the elongated strip has a height of at least two fiber diameters.

9. The article as recited in claim 1, wherein the fibers of the flow turbulator have common fiber diameters, and the elongated strip has a height of at least four fiber diameters.

10. The article as recited in claim 1, wherein the elongated strip has a height of at least 5 mils (0.127 millimeters).

11. The article as recited in claim 1, wherein the ceramic matrix composite wall is in an airfoil section and defines at least a portion of an airfoil profile of the airfoil section.

12. The article as recited in claim 1, wherein the fibers in the flow turbulator are transverse to one of the first and second pluralities of the woven fibers in the ceramic matrix composite wall.

13. The article as recited in claim 1, wherein the fibers in the flow turbulator are transverse to both of the first and second pluralities of the woven fibers in the ceramic matrix composite wall.

14. An airfoil comprising:
an airfoil section defining an airfoil profile, the airfoil section including a ceramic wall having an exterior side defining at least a portion of the airfoil profile and an interior side defining at least a portion of a passage, the wall formed of ceramic matrix composite comprising woven fibers that are dispersed in a ceramic body matrix, wherein the woven fibers in the ceramic matrix composite wall include a first plurality of fibers that are oriented in a common first direction and second plurality of fibers that are oriented in a common second direction, wherein the second direction is different from the first direction, and wherein the interior side of the ceramic wall includes a ceramic matrix composite flow turbulator that projects into the passage, wherein the flow turbulator is an elongated strip having an elongated direction that is transverse to at least one of the first and second directions, and wherein the ceramic matrix composite of the flow turbulator includes a plurality of fibers disposed in a ceramic matrix, and the fibers of the flow turbulator are unidirectionally oriented in the elongated direction of the elongated strip.

15. The airfoil as recited in claim 14, wherein the fibers of the flow turbulator have common fiber diameters, and the elongated strip has a height of at least two fiber diameters.

16. The airfoil as recited in claim 14, wherein the ceramic matrix of the body portion and the ceramic matrix of the flow turbulator have equivalent base compositions.

17. The airfoil as recited in claim 14 wherein the fibers in the flow turbulator are transverse to one of the first and second pluralities of the woven fibers in the ceramic matrix composite wall.

18. A gas turbine engine comprising:
a compressor section;
a combustor in fluid communication with the compressor section; and
a turbine section in fluid communication with the combustor,
at least one of the turbine section or the compressor section including an article having a ceramic matrix composite wall defining at least a side of a passage, the ceramic wall including a ceramic matrix composite flow turbulator that projects into the passage, wherein the ceramic matrix composite of the wall comprises woven fibers that are dispersed in a ceramic body matrix, wherein the woven fibers include a first plurality of fibers that are oriented in a common first direction and second plurality of fibers that are oriented in a common second direction, wherein the second direction is different from the first direction, and wherein the flow turbulator is an elongated strip having an elongated direction that is transverse to at least one of the first and second directions, and wherein the ceramic matrix composite of the flow turbulator includes a plurality of fibers disposed in a ceramic matrix, and the fibers of the flow turbulator are unidirectionally oriented in the elongated direction of the elongated strip.

* * * * *